(12) United States Patent
Nguyen

(10) Patent No.: US 7,334,636 B2
(45) Date of Patent: Feb. 26, 2008

(54) METHODS OF CREATING HIGH-POROSITY PROPPED FRACTURES USING RETICULATED FOAM

(75) Inventor: Philip D. Nguyen, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 148 days.

(21) Appl. No.: 11/053,280

(22) Filed: Feb. 8, 2005

(65) Prior Publication Data

US 2006/0175058 A1   Aug. 10, 2006

(51) Int. Cl.
   *E21B 43/26*   (2006.01)
(52) U.S. Cl. .................................................. 166/280.1
(58) Field of Classification Search ...................... None
   See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,015,995 A | 4/1977 | Hess | 106/287 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |

(Continued)

FOREIGN PATENT DOCUMENTS

CA    2063877    5/2003

(Continued)

OTHER PUBLICATIONS

Halliburton, *CoalStim*[SM] *Service, Helps Boost Cash Flow From CBM Assets*, Stimulation, HO3679 Oct. 3, 2003, Halliburton Communications.

(Continued)

*Primary Examiner*—Jennifer H. Gay
*Assistant Examiner*—Kerry W. Leonard
(74) *Attorney, Agent, or Firm*—Robert A. Kent; Baker Botts, L.L.P.

(57) ABSTRACT

One embodiment of the prevent invention provides a method of creating a high porosity propped fracture comprising creating a slurry comprising a treatment fluid, proppant particulates, pieces of reticulated foam having cells, and an adhesive substance such that the adhesive substance at least partially coats the proppant particulates and such that the proppant particulates become substantially embedded within the cells of the reticulated foam; and, depositing at least a portion of the reticulated foam fragments having proppant particulates embedded therein in one or more fractures within a portion of a subterranean formation so as to form a high porosity propped fracture.

20 Claims, No Drawings

U.S. PATENT DOCUMENTS

| | | | |
|---|---|---|---|
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstoesser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,494,103 A | 2/1996 | Surjaatmadja et al. | 166/222 |
| 5,494,178 A | 2/1996 | Nguyen et al. | 166/276 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constien | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |

| Patent No. | Kind | Date | Inventor | Class |
|---|---|---|---|---|
| 5,783,822 | A | 7/1998 | Buchanan et al. | 250/259 |
| 5,787,986 | A | 8/1998 | Weaver et al. | 166/280 |
| 5,791,415 | A | 8/1998 | Nguyen et al. | 166/280 |
| 5,799,734 | A | 9/1998 | Norman et al. | 166/278 |
| 5,806,593 | A | 9/1998 | Suries | 166/270 |
| 5,830,987 | A | 11/1998 | Smith | 528/332 |
| 5,833,000 | A | 11/1998 | Weaver et al. | 166/276 |
| 5,833,361 | A | 11/1998 | Funk | 366/80 |
| 5,836,391 | A | 11/1998 | Jonasson et al. | 166/295 |
| 5,836,392 | A | 11/1998 | Urlwin-Smith | 166/295 |
| 5,837,656 | A | 11/1998 | Sinclair et al. | 507/220 |
| 5,837,785 | A | 11/1998 | Kinsho et al. | 525/527 |
| 5,839,510 | A | 11/1998 | Weaver et al. | 166/276 |
| 5,849,401 | A | 12/1998 | El-Afandi et al. | 428/215 |
| 5,849,590 | A | 12/1998 | Anderson, II et al. | 436/27 |
| 5,853,048 | A | 12/1998 | Weaver et al. | 166/279 |
| 5,864,003 | A | 1/1999 | Qureshi et al. | 528/141 |
| 5,865,936 | A | 2/1999 | Edelman et al. | 156/310 |
| 5,871,049 | A | 2/1999 | Weaver et al. | 166/276 |
| 5,873,413 | A | 2/1999 | Chatterji et al. | 166/293 |
| 5,875,844 | A | 3/1999 | Chatterji et al. | 166/293 |
| 5,875,845 | A | 3/1999 | Chatterji et al. | 166/293 |
| 5,875,846 | A | 3/1999 | Chatterji et al. | 166/293 |
| 5,893,383 | A | 4/1999 | Fracteau | 137/14 |
| 5,893,416 | A | 4/1999 | Read | 166/304 |
| 5,908,073 | A | 6/1999 | Nguyen et al. | 166/276 |
| 5,911,282 | A | 6/1999 | Onan et al. | 175/72 |
| 5,916,933 | A | 6/1999 | Johnson et al. | 523/208 |
| 5,921,317 | A | 7/1999 | Dewprashad et al. | 166/208 |
| 5,924,488 | A | 7/1999 | Nguyen et al. | 166/280 |
| 5,929,437 | A | 7/1999 | Elliott et al. | 250/259 |
| 5,944,105 | A | 8/1999 | Nguyen | 166/278 |
| 5,945,387 | A | 8/1999 | Chatterji et al. | 507/224 |
| 5,948,734 | A | 9/1999 | Sinclair et al. | 507/219 |
| 5,957,204 | A | 9/1999 | Chatterji et al. | 166/295 |
| 5,960,880 | A | 10/1999 | Nguyen et al. | 166/280 |
| 5,964,291 | A | 10/1999 | Bourne et al. | 166/295 |
| 5,969,006 | A | 10/1999 | Onan et al. | 523/166 |
| 5,977,283 | A | 11/1999 | Rossitto | 528/44 |
| 5,994,785 | A | 11/1999 | Higuchi et al. | 527/789 |
| RE36,466 | E | 12/1999 | Nelson et al. | 166/280 |
| 6,003,600 | A | 12/1999 | Nguyen et al. | 166/281 |
| 6,004,400 | A | 12/1999 | Bishop et al. | 134/2 |
| 6,006,835 | A | 12/1999 | Onan et al. | 166/295 |
| 6,006,836 | A | 12/1999 | Chatterji et al. | 166/295 |
| 6,012,524 | A | 1/2000 | Chatterji et al. | 166/295 |
| 6,016,870 | A | 1/2000 | Dewprashad et al. | 166/295 |
| 6,024,170 | A | 2/2000 | McCabe et al. | 166/300 |
| 6,028,113 | A | 2/2000 | Scepanski | 514/643 |
| 6,028,534 | A | 2/2000 | Ciglenec et al. | 340/856.2 |
| 6,040,398 | A | 3/2000 | Kinsho et al. | 525/527 |
| 6,047,772 | A | 4/2000 | Weaver et al. | 166/276 |
| 6,059,034 | A | 5/2000 | Rickards et al. | 166/280 |
| 6,059,035 | A | 5/2000 | Chatterji et al. | 166/293 |
| 6,059,036 | A | 5/2000 | Chatterji et al. | 166/294 |
| 6,068,055 | A | 5/2000 | Chatterji et al. | 166/293 |
| 6,069,117 | A | 5/2000 | Onan et al. | 507/202 |
| 6,074,739 | A | 6/2000 | Katagiri | 428/323 |
| 6,079,492 | A | 6/2000 | Hoogteijling et al. | 166/276 |
| 6,098,711 | A | 8/2000 | Chatterji et al. | 166/294 |
| 6,114,410 | A | 9/2000 | Betzold | 523/130 |
| 6,123,871 | A | 9/2000 | Carroll | 252/301.36 |
| 6,123,965 | A | 9/2000 | Jacon et al. | 424/489 |
| 6,124,246 | A | 9/2000 | Heathman et al. | 507/219 |
| 6,130,286 | A | 10/2000 | Thomas et al. | 524/507 |
| 6,135,987 | A | 10/2000 | Tsai et al. | 604/365 |
| 6,140,446 | A | 10/2000 | Fujiki et al. | 528/15 |
| 6,148,911 | A | 11/2000 | Gipson et al. | 166/248 |
| 6,152,234 | A | 11/2000 | Newhouse et al. | 166/403 |
| 6,162,766 | A | 12/2000 | Muir et al. | 507/267 |
| 6,169,058 | B1 | 1/2001 | Le et al. | 507/222 |
| 6,172,011 | B1 | 1/2001 | Card et al. | 507/204 |
| 6,172,077 | B1 | 1/2001 | Curtis et al. | 514/278 |
| 6,176,315 | B1 | 1/2001 | Reddy et al. | 166/295 |
| 6,177,484 | B1 | 1/2001 | Surles | 523/131 |
| 6,184,311 | B1 | 2/2001 | O'Keefe et al. | 525/438 |
| 6,187,834 | B1 | 2/2001 | Thayer et al. | 522/15 |
| 6,189,615 | B1 | 2/2001 | Sydansk | 166/270 |
| 6,192,985 | B1 | 2/2001 | Hinkel et al. | 166/280 |
| 6,192,986 | B1 | 2/2001 | Urlwin-Smith | 166/295 |
| 6,196,317 | B1 | 3/2001 | Hardy | 166/295 |
| 6,202,751 | B1 | 3/2001 | Chatterji et al. | 166/276 |
| 6,209,643 | B1 | 4/2001 | Nguyen et al. | 166/276 |
| 6,209,644 | B1 | 4/2001 | Brunet | 166/297 |
| 6,209,646 | B1 | 4/2001 | Reddy et al. | 166/300 |
| 6,210,471 | B1 | 4/2001 | Craig | 106/31.08 |
| 6,214,773 | B1 | 4/2001 | Harris et al. | 507/271 |
| 6,231,664 | B1 | 5/2001 | Chatterji et al. | 106/724 |
| 6,234,251 | B1 | 5/2001 | Chatterji et al. | 166/295 |
| 6,238,597 | B1 | 5/2001 | Yim et al. | 252/512 |
| 6,241,019 | B1 | 6/2001 | Davidson et al. | 166/249 |
| 6,242,390 | B1 | 6/2001 | Mitchell et al. | 507/211 |
| 6,244,344 | B1 | 6/2001 | Chatterji et al. | 166/295 |
| 6,257,335 | B1 | 7/2001 | Nguyen et al. | 166/280 |
| 6,260,622 | B1 | 7/2001 | Blok et al. | 166/305.1 |
| 6,271,181 | B1 | 8/2001 | Chatterji et al. | 507/219 |
| 6,274,650 | B1 | 8/2001 | Cui | 523/457 |
| 6,279,652 | B1 | 8/2001 | Chatterji et al. | 166/194 |
| 6,279,656 | B1 | 8/2001 | Sinclair et al. | 166/310 |
| 6,283,214 | B1 | 9/2001 | Guinot et al. | 166/297 |
| 6,302,207 | B1 | 10/2001 | Nguyen et al. | 166/276 |
| 6,306,998 | B1 | 10/2001 | Kimura et al. | 528/12 |
| 6,311,773 | B1 | 11/2001 | Todd et al. | 166/280 |
| 6,321,841 | B1 | 11/2001 | Eoff et al. | 166/291 |
| 6,323,307 | B1 | 11/2001 | Bigg et al. | 528/354 |
| 6,326,458 | B1 | 12/2001 | Gruber et al. | 528/354 |
| 6,328,105 | B1 | 12/2001 | Betzold | 166/280 |
| 6,328,106 | B1 | 12/2001 | Griffith et al. | 166/295 |
| 6,330,916 | B1 | 12/2001 | Rickards et al. | 166/280 |
| 6,330,917 | B2 | 12/2001 | Chatterji et al. | 166/295 |
| 6,350,309 | B2 | 2/2002 | Chatterji et al. | 106/677 |
| 6,357,527 | B1 | 3/2002 | Norman et al. | 166/300 |
| 6,364,018 | B1 | 4/2002 | Brannon et al. | 166/280.2 |
| 6,364,945 | B1 | 4/2002 | Chatterji et al. | 106/677 |
| 6,367,165 | B1 | 4/2002 | Huttlin | 34/582 |
| 6,367,549 | B1 | 4/2002 | Chatterji et al. | 166/292 |
| 6,372,678 | B1 | 4/2002 | Youngsman et al. | 504/128 |
| 6,376,571 | B1 | 4/2002 | Chawla et al. | 522/64 |
| 6,387,986 | B1 | 5/2002 | Moradi-Araghi et al. | 523/211 |
| 6,390,195 | B1 | 5/2002 | Nguyen et al. | 166/276 |
| 6,401,817 | B1 | 6/2002 | Griffith et al. | 166/295 |
| 6,405,797 | B2 | 6/2002 | Davidson et al. | 166/249 |
| 6,406,789 | B1 | 6/2002 | McDaniel et al. | 428/403 |
| 6,408,943 | B1 | 6/2002 | Schultz et al. | 166/285 |
| 6,422,314 | B1 | 7/2002 | Todd et al. | 166/312 |
| 6,439,309 | B1 | 8/2002 | Matherly et al. | 166/276 |
| 6,439,310 | B1 | 8/2002 | Scott, III et al. | 166/308 |
| 6,440,255 | B1 | 8/2002 | Kohlhammer et al. | 156/283 |
| 6,446,727 | B1 | 9/2002 | Zemlak et al. | 166/308 |
| 6,448,206 | B1 | 9/2002 | Griffith et al. | 507/219 |
| 6,450,260 | B1 | 9/2002 | James et al. | 166/277 |
| 6,454,003 | B1 | 9/2002 | Chang et al. | 166/270 |
| 6,458,885 | B1 | 10/2002 | Stengal et al. | 524/507 |
| 6,485,947 | B1 | 11/2002 | Rajgarhia et al. | 435/139 |
| 6,488,091 | B1 | 12/2002 | Weaver et al. | 166/300 |
| 6,488,763 | B2 | 12/2002 | Brothers et al. | 106/692 |
| 6,494,263 | B2 | 12/2002 | Todd | 166/312 |
| 6,503,870 | B2 | 1/2003 | Griffith et al. | 507/219 |
| 6,508,305 | B1 | 1/2003 | Brannon et al. | 166/293 |
| 6,527,051 | B1 | 3/2003 | Reddy et al. | 166/300 |
| 6,528,157 | B1 | 3/2003 | Hussain et al. | 428/325 |
| 6,531,427 | B1 | 3/2003 | Shuchart et al. | 507/267 |
| 6,538,576 | B1 | 3/2003 | Schultz et al. | 340/859.6 |
| 6,543,545 | B1 | 4/2003 | Chatterji et al. | 166/381 |
| 6,552,333 | B1 | 4/2003 | Storm et al. | 250/269.3 |
| 6,554,071 | B1 | 4/2003 | Reddy et al. | 166/293 |

| | | | |
|---|---|---|---|
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,778 B1 | 10/2003 | Ayoub et al. | 507/202 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nugyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 2001/0016562 A1 | 8/2001 | Muir et al. | 507/219 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006096 A1 | 1/2005 | Nguyen et al. | 166/295 |
| 2005/0034862 A1 | 2/2005 | Nguyen et al. | 166/281 |
| 2005/0045326 A1 | 3/2005 | Nguyen | 166/278 |
| 2005/0051331 A1 | 3/2005 | Nguyen et al. | 166/280.2 |

FOREIGN PATENT DOCUMENTS

| | | | |
|---|---|---|---|
| EP | 0313243 B1 | | 10/1988 |
| EP | 0528595 A1 | | 8/1992 |
| EP | 0510762 A2 | | 11/1992 |
| EP | 0643196 A2 | | 6/1994 |
| EP | 0834644 A2 | | 4/1998 |
| EP | 0853186 A2 | | 7/1998 |
| EP | 0864726 A2 | | 9/1998 |
| EP | 0879935 B1 | | 11/1998 |
| EP | 0933498 A1 | | 8/1999 |
| EP | 1001133 A1 | | 5/2000 |
| EP | 1132569 A2 | | 9/2001 |
| EP | 1326003 A1 | | 7/2003 |
| EP | 1362978 A1 | | 11/2003 |
| EP | 1394355 A1 | | 3/2004 |
| EP | 1396606 A2 | | 3/2004 |
| EP | 1398640 A1 | | 3/2004 |
| EP | 1403466 A2 | | 3/2004 |
| EP | 1464789 A1 | | 10/2004 |
| GB | 1107584 | | 3/1968 |
| GB | 1264180 | | 12/1969 |
| GB | 1292718 | | 10/1972 |
| GB | 2382143 A | | 4/2001 |
| WO | WO 93/15127 | | 8/1993 |
| WO | WO 94/07949 | | 4/1994 |
| WO | WO 94/08078 | | 4/1994 |
| WO | WO 94/08090 | | 4/1994 |
| WO | WO 95/09879 | | 4/1995 |
| WO | WO 97/11845 | | 4/1997 |
| WO | WO 99/27229 | | 6/1999 |
| WO | WO 01/81914 | | 11/2001 |
| WO | WO 01/87797 A1 | | 11/2001 |
| WO | WO 02/12674 A1 | | 2/2002 |
| WO | WO 03/027431 A1 | | 4/2003 |
| WO | WO 2004/037946 A1 | | 5/2004 |
| WO | WO 2004/038176 A1 | | 5/2004 |
| WO | WO 2005/021928 A2 | | 3/2005 |

OTHER PUBLICATIONS

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 4, 2004, Halliburton Communications.

Halliburton Technical Flier—Multi Stage Frac Completion Methods, 2 pages.

Halliburton "CobraFrac[SM] Service, Coiled Tubing Fracturing—Cost-Effective Method for Stimulating Untapped Reserves", 2 pages, 2004.

Halliburton "CobraJetFrac[SM] Service, Cost-Effective Technology That Can Help Reduce Cost per BOE Produced, Shorten Cycle time and Reduce Capex".

Halliburton Cobra Frac Advertisement, 2001.

Halliburton "SurgiFrac[SM] Service, a Quick and cost-Effective Method to Help Boost Production From Openhole Horizontal Completions", 2002.

Halliburton, *SandWedge® NT Conductivity Enhancement System, Enhances Proppant Pack Conductivity and Helps Prevent Intrusion* of Formation Material for Improved Long-Term Production, Stimulation, HO2289 May 4, 2004, Halliburton Communications.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Alberston, 2001.

Gorman, *Plastic Electric: Lining up the Future of Conducting Polymers* Science News, vol. 163, May 17, 2003.

Simmons et al., "*Poly(phenyllactide): Synthesis, Characterization, and Hydrolytic Degradation, Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch. 12, pp. 147-159, 2001.

Cantu et al., "*Laboratory and Field Evaluation of a Combined Fluid-Loss Control Additive and Gel Breaker for Fracturing Fluids,*" SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Albertsson et al., "*Aliphatic Polyesters: Synthesis, Properties and Applications*", Advances in Polymer Science, vol. 57 Degradable Aliphatic Polyesters, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @www.cdxgas.com/solution.html, printed pp. 1-2.

CDX Gas, "*What is Coalbed Methane?*" CDX, LLC. Available @www.cdxgas.com/what.html, printed p. 1.

Halliburton brochure entitled "H2Zero™ Service Introducing The Next Generation of cost-Effective Conformance Control Solutions", 2002.

Halliburton brochure entitled INJECTROL® A Component:, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "IINJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign search report and opinion (CPW 21582 EP), Mar. 11, 2005.

S. W. Almond, et al., "*Factors Affecting Proppant Flowback With Resin Coated Proppants*," Society of Petroleum Engineers, Inc., SPE 30096, p. 171-186, 1995.

METHODS OF CREATING HIGH-POROSITY PROPPED FRACTURES USING RETICULATED FOAM

BACKGROUND

The present invention relates to high porosity propped fractures and methods of creating high porosity propped fractures in portions of subterranean formations.

Subterranean wells (such as hydrocarbon producing wells, water producing wells, and injection wells) are often stimulated by hydraulic fracturing treatments. In hydraulic fracturing treatments, a fracturing fluid, which also functions as a carrier fluid, is pumped into a portion of a subterranean formation at a rate and pressure such that the subterranean formation breaks down and one or more fractures are formed. Typically, particulate solids, such as graded sand, are suspended in a portion of the fracturing fluid are then deposited in the fractures. These particulate solids, or "proppant particulates," serve to prevent the fractures from fully closing once the hydraulic fracturing pressure is released. By keeping the fracture from fully closing, the proppant particulates aid in forming conductive paths through which fluids may flow.

The degree of success of a fracturing operation depends, at least in part, upon fracture porosity and conductivity once the fracturing operation is stopped and production is begun. Traditional fracturing operations place a large volume of proppant particulates into a fracture and the porosity of the resultant packed propped fracture is then related to the interconnected interstitial spaces between the abutting proppant particulates. Thus, the resultant fracture porosity from a traditional fracturing operation is closely related to the strength of the placed proppant particulates (if the placed particulates crush then the pieces of broken proppant may plug the interstitial spaces) and the size and shape of the placed particulate (larger, more spherical proppant particulates generally yield increased interstitial spaces between the particulates).

One way proposed to combat problems inherent in tight proppant particulate packs involves placing a much reduced volume of proppant particulates in a fracture to create what is referred to herein as a partial monolayer or "high porosity" fracture. In such operations the proppant particulates within the fracture may be widely spaced but they are still sufficient to hold the fracture open and allow for production. Such operations allow for increased fracture conductivity due, at least in part, to the fact the produced fluids may flow around widely spaced proppant particulates rather than just through the relatively small interstitial spaces in a packed proppant bed.

While this concept of partial monolayer fracturing has been investigated in the industry, the concept has not been successfully applied for a number of reasons. One problem is that successful placement of a partial monolayer of proppant particulates presents unique challenges in the relative densities of the particulates versus the carrier fluid. Another problem lies in the fact that placing a proppant that tends to crush or embed under pressure may allow the fracture to pinch or close in places once the fracturing pressure is released.

SUMMARY

The present invention relates to high porosity propped fractures and methods of creating high porosity propped fractures in portions of subterranean formations.

One embodiment of the prevent invention provides a method of creating a high porosity propped fracture comprising creating a slurry comprising a treatment fluid, proppant particulates, pieces of reticulated foam having cells, and an adhesive substance such that the adhesive substance at least partially coats the proppant particulates and such that the proppant particulates become substantially embedded within the cells of the reticulated foam; and, depositing at least a portion of the reticulated foam fragments having proppant particulates embedded therein in one or more fractures within a portion of a subterranean formation so as to form a high porosity propped fracture.

Another embodiment of the prevent invention provides a method of fracturing a portion of a subterranean formation comprising creating or extending one or more fractures within a portion of a subterranean formation using hydraulic pressure; creating a slurry comprising a treatment fluid, proppant particulates, pieces of reticulated foam having cells, and an adhesive substance such that the adhesive substance at least partially coats the proppant particulates and such that the proppant particulates become substantially embedded within the cells of the reticulated foam; and, depositing at least a portion of the reticulated foam fragments having proppant particulates embedded therein in the one or more fractures within the portion of the subterranean formation so as to form a high porosity propped fracture.

The features and advantages of the present invention will be readily apparent to those skilled in the art upon a reading of the description of the embodiments that follows.

DETAILED DESCRIPTION

The present invention relates to high porosity propped fractures and methods of creating high porosity propped fractures in portions of subterranean formations.

The present invention provides methods of creating high porosity propped fractures by placing treatment fluid with a mixture of an adhesive substance, proppant particulates, and reticulated foam slurried therein into one or more fractures within a subterranean formation. In such embodiments at least a portion, and preferably a substantial portion of the proppant particulates become entrapped within the open-cell structure of the reticulated foam as described in more detail below.

Some embodiments of the present invention comprise creating a slurry comprising a treatment fluid, proppant particulates, pieces of reticulated foam, and an adhesive substance such that the adhesive at least partially coats the proppant particulates and such that the proppant particulates become embedded within the cells of the reticulated foam; and, pumping the slurry down hole. In some embodiments, the proppant particulates may be dry-coated with an adhesive substance and then slurried into a treatment fluid having pieces of reticulated foam therein such that the proppant particulates become embedded within the cells of the reticulated foam. In some embodiments, the proppant particulates may be dry-coated with an adhesive substance and then mixed with pieces of reticulated foam such that the coated particulates become embedded within the cells of the reticulated foam. In some embodiments the proppant particulates may be mixed with pieces of reticulated foam such that the proppant particulates become embedded within the cells of the reticulated foam; coating, at least partially, the embedded proppant with an adhesive substance; slurrying the mixture of adhesive coated proppant embedded within the cells of the reticulated foam into a treatment fluid; and, pumping the slurry down hole.

I. Suitable Treatment Fluids

Any treatment fluid suitable for a fracturing or frac-packing application may be used in accordance with the teachings of the present invention, including aqueous gels, viscoelastic surfactant gels, oil gels, heavy brines, foamed gels and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In exemplary embodiments of the present invention, the treatment fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, inter alia, reduces fluid loss and allows the treatment fluid to transport significant quantities of suspended proppant particles. The water used to form the treatment fluid may be salt water, brine, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous carrier fluids to revert to thin fluids that can be produced back to the surface after they have been used to place proppant particles in subterranean fractures. The gel breaker used is typically present in the fracturing fluid in an amount in the range of from about 0.5% to about 10% by weight of the gelling agent. The fracturing fluids may also include one or more of a variety of well-known additives, such as gel stabilizers, fluid loss control additives, clay stabilizers, bactericides, and the like.

II. Suitable Adhesive Substances

Adhesive substances suitable for use in the present invention include non-aqueous tackifying agents; aqueous tackifying agents; silyl-modified polyamides; and curable resin compositions that are capable of curing to form hardened substances. In addition to encouraging the proppant particulates to remain entrapped within the open cells of the reticulated foam, the use of an adhesive substance may yield a propped fracture that experiences very little or no undesirable proppant flow back. Adhesive substances may be applied on-the-fly, applying the adhesive substance to the proppant particulate at the well site, directly prior to pumping the fluid-proppant mixture into the well bore. The tacky nature of the adhesive substance enhances the stability of the proppant particulates inside the pieces of reticulated foam and thus minimizes the dispersion of individual grains of proppant particulates under high shear, such as the high shear produced when the slurried foam pieces and proppant particulates are pumped down hole. Moreover, once the slurried foam pieces and proppant particulates are placed within one or more fractures, the presence of the adhesive substance helps reduce flow back of the proppant particulates.

A. Adhesive Substances—Non-aqueous Tackifying Agents

Tackifying agents suitable for use in the consolidation fluids of the present invention comprise any compound that, when in liquid form or in a solvent solution, will form a non-hardening coating upon a particulate. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Other suitable tackifying agents are described in U.S. Pat. No. 5,853,048 issued to Weaver, et al. and U.S. Pat. No. 5,833,000 issued to Weaver, et al., the relevant disclosures of which are herein incorporated by reference.

Tackifying agents suitable for use in the present invention may be either used such that they form non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference. Other suitable tackifying agents are described in U.S. Pat. No. 5,853,048 issued to Weaver, et al.

B. Adhesive Substances—Aqueous Tackifying Agents

Suitable aqueous tackifying agents are capable of forming at least a partial coating upon the surface of a particulate (such as a proppant particulate). Generally, suitable aqueous tackifying agents are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying compound is placed in the subterranean formation. In some embodiments, a pretreatment may be first contacted with the surface of a particulate to prepare it to be coated with an aqueous tackifying compound. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifier compound may enhance the grain-to-grain contact between the individual particulates within the formation (be they proppant particulates, formation fines, or other particulates), helping bring about the consolidation of the particulates into a cohesive, flexible, and permeable mass.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. Methods of determining suitable aqueous tackifying agents and additional disclosure on aqueous tackifying agents can be found in U.S. patent application Ser. No. 10/864,061 and filed Jun. 9, 2004 and U.S. patent application Ser. No. 10/864,618 and filed Jun. 9, 2004 the relevant disclosures of which are hereby incorporated by reference.

C. Adhesive Substances—Silyl-Modified Polyamides

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

D. Adhesive Substances—Curable Resins

Resins suitable for use in the consolidation fluids of the present invention include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

III. Suitable Proppant Particulates

Particulates suitable for use in the present invention may be comprised of any material suitable for use in subterranean operations. Suitable particulate materials include, but are not limited to, sand; bauxite; ceramic materials; glass materials; polymer materials; nylon materials; Teflon® materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable, suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Typically, the particulates have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture, are often included in proppant and gravel treatments.

IV. Suitable Reticulated Foams

Reticulated foam possesses an open cell, three-dimensional structure of skeletal strands with high porosity and permeability. The reticulated foam pieces useful in accordance with this invention may be formed of materials that are able to withstand the temperatures and pressures commonly found in down hole environments. The foams may be manufactured from various materials including, but not limited to, resins, polyolefins, polyurethanes, polyvinylchlorides, metals and ceramics. The reticulated foam fragments preferably have a pore density in the range of from about 5 to about 80 pores per linear inch (ppi). The choice of reticulated foam pore density may be related, at least in part, to the size of the chosen proppant particulate. For example, in embodiments wherein a proppant mesh size from about 4 to about 40 U.S. Mesh is chosen, it may be desirable to use a reticulated foam with a pore density of between about 5 ppi and 40 ppi. In embodiments wherein a proppant mesh size from about 40 to about 100 U.S. Mesh is chosen, it may be desirable to use a reticulated foam with a pore density of between about 40 ppi and 80 ppi.

Reticulated foams are widely available on the marketplace in the form of large sheets. For the purposes of the present invention, the foam must be made into pieces before being used. Preferably, the pieces have lengths no longer than about 1 inch, widths no longer than about 0.5 inch, and thickness no longer than about 0.5 inch. In some embodiments of the present invention the reticulated foam pieces may have lengths of about 0.5 inch, widths of about 0.25 inch and thicknesses of about 0.12 inch. In some embodiments the reticulated foam fragments are present in the treatment fluid in an amount in the range of from about 0.1% to about 5% by weight of the particulate solids therein. In other embodiments the reticulated foam fragments are present in the treatment fluid in an amount in the range of from about 0.25% to about 1.5%. In other embodiments the reticulated foam fragments are present in the treatment fluid in an amount in the range of from about 1%.

The nature of reticulated foam allows it to deform and compress as it enters a perforation or fracture without bridging off. Even after the reticulated foam is loaded with proppant particulates it remains substantially flexible and compressible. Moreover, the three-dimensional network of the reticulated foam enhances the embedment of proppant particulates into the foam and allows the proppant particulates to become embedded within the foam structure.

V. High-Porosity Propped Fractures

The methods of the present invention may be used, inter alia, to create high porosity fractures having increased conductivity as compared to a traditional packed propped fracture. The greater conductivity is believed to be due, at least in part, to a high porosity fracture that may be formed using a lower than traditional proppant loading in combination with an adhesive substance and pieces of reticulated foam so that the proppant particulates are encouraged to form aggregates within the open cell structure of the reticulated foam. The presence of the adhesive substance makes it substantially more likely that the proppant particulates will remain entrapped within the cells of the reticulated foam.

The use of lower than traditional proppant loading in combination with an adhesive substance and reticulated foam may facilitate the formation of a conductive fracture with porosity much greater than about 40% while still maintaining enough conductive channels for production. (Porosity values expressed herein are unstressed porosities, that is, the porosity before the fracture has closed or applied any substantial mechanical stress.) Some embodiments of the present invention may be used to form a fracture exhibiting a porosity of at least about 50%. Other embodiments of the present invention may be used to form a fracture exhibiting a porosity of at least about 60%. Other embodiments of the present invention may be used to form a fracture exhibiting a porosity of at least about 70%. Other embodiments of the present invention may be used to form a fracture exhibiting a porosity of at least about 80%. Other embodiments of the present invention may be used to form a fracture exhibiting a porosity of at least about 90%.

The lower than traditional proppant loading in combination with an adhesive substance and reticulated foam as used in the present invention may allow for increased conductivity and increased proppant particulate performance, at least in part, because the high porosity fractures they form allow for increased levels of open channels. With a high porosity fracture there may be more open spaces in the propped fracture that may remain open, even under severe closure stresses than found in traditional, high proppant loading applications.

By increasing the percentage of open spaces within a propped fracture, the methods of the present invention may act not only to increase the available space for production but also to eliminate non-darcy effects during production. Generally, non-Darcy effects are caused by inertial forces due to expansion and contraction of the local flow inside flow channels found in typical proppant packs. The high porosity propped fractures, decrease or eliminate the cycles of expansion and contraction because the interstitial spaces found in traditional propped fractures are not present. The article, *Recent Advances in Hydraulic Fracturing*, Gidley, J. L., et al. (ed.), Society of Petroleum Engineers, Richardson, Tex. (1989) discusses non-Darcy flow and its effects on conductivity of proppant beds and fractures, its relevant teachings are hereby incorporated by reference.

The present invention describes reduced particulate loadings to create a high porosity fracture compared to traditional fracturing applications that create packed fractures. Tables 1 and 2 provide example proppant loading schedules for a fracturing treatment. As will be understood by one skilled in the art, each operation is unique, and thus, may require its own unique proppant addition schedule. However, the example in Table 1 shows one possible addition schedule for achieving a high porosity fracture having a porosity in excess of about 75% for most of the propped fracture area. By contrast, Table 2 shows the proppant addition schedule for an operation placing a traditional packed proppant bed within a fracture that results in a packed fracture with porosity around 40% for most of the propped fracture area.

TABLE 1

High Porosity Fracture Treatment Proppant Addition Schedule

| Fluid name | Stage Volume (gal) | Proppant Concentration (lb/gal) | Treatment Rate (BPM) |
|---|---|---|---|
| DeltaFrac 20 | 10000 | 0.0 | 25 |
| DeltaFrac 20 | 7000 | 0.2 | 25 |
| DeltaFrac 20 | 5000 | 0.3 | 25 |
| DeltaFrac 20 | 5000 | 0.5 | 25 |
| Flush | 5200 | 0.0 | 25 |
| Totals | 32200 | 5400 | |

TABLE 2

Conventional Treatment Proppant Addition Schedule

| Fluid name | Stage Volume (gal) | Proppant Concentration (lb/gal) | Treatment Rate (BPM) |
|---|---|---|---|
| DeltaFrac 20 | 10000 | 0.0 | 25 |
| DeltaFrac 20 | 5000 | 1.0 | 25 |
| DeltaFrac 20 | 5000 | 2.0 | 25 |
| DeltaFrac 20 | 4000 | 3.0 | 25 |
| DeltaFrac 20 | 3000 | 4.0 | 25 |
| Flush | 5200 | 0.0 | 25 |
| Totals | 32200 | 39000 | |

To facilitate a better understanding of the present invention, the following examples of preferred embodiments are given. In no way should the following examples be read to limit or define the scope of the invention.

EXAMPLES

Example 1

100 grams of 20/40 U.S. Mesh Brady sand proppant particulates were coated with 2 mL of an adhesive substance (Expedite XC resin, commercially available from Halliburton Energy Services of Duncan, Okla.) by placing them in contact and submitting them to an overhead stirrer. While the stirrer continued, 1 gram of reticulate foam pieces were added to the mixture and the stirring continued for 30 seconds. It was observed that most of the proppant particulates became entrapped within the reticulated foam pieces.

The proppant-laden foam pieces were then poured into a beaker containing 500 mL of 60 lbs/Mgal HEC gel (a viscosified treatment fluid commercially available from Halliburton Energy Service, of Duncan, Okla.). The combination of treatment fluid and proppant-laden foam was stirred with an overhead stirrer for 30 seconds. It was observed that most of the proppant remained inside the reticulated foam pieces.

Example 2

The experiment as described in Example 1, above, was repeated except that 2 mL of Sandwedge NT (a non-aqueous tackifying agent commercially available from Halliburton Energy Service, of Duncan, Okla.) was used in the place of the Expedite XC resin used in Example 1. Just as above, when the proppant-laden foam was added to a treatment fluid and stirred with an overhead stirrer for 30 seconds most of the proppant remained inside the reticulated foam pieces.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of creating a high porosity propped fracture comprising:

creating a slurry comprising a treatment fluid, proppant particulates, pieces of reticulated foam having cells, and an adhesive substance such that the adhesive substance at least partially coats the proppant particulates and such that the proppant particulates become substantially embedded within the cells of the reticulated foam; and, depositing at least a portion of the pieces of reticulated foam having proppant particulates embedded therein in one or more fractures within a portion of a subterranean formation so as to form a high porosity propped fracture.

2. The method of claim 1 wherein the high porosity propped fracture has a porosity of at least about 50%.

3. The method of claim 1 wherein the slurry comprises less than about 1 pound of proppant particulates per gallon of treatment fluid.

4. The method of claim 1 wherein the treatment fluid comprises at least one treatment fluid selected from the group consisting of: an aqueous gel, an aqueous gel comprising a polysaccharide gelling agent, an aqueous gel comprising a crosslinked polysaccharide gelling agent, a viscoelastic surfactant gel, an oil gel, a heavy brine, a foamed gel, an emulsion, and combinations thereof, and wherein the proppant particulates comprise at least one particulate material selected from the group consisting of: sand; bauxite; a ceramic material; a glass material; a polymeric material; a nylon material; polytetrafluoroethylene; nut shell pieces; seed shell pieces; cured resinous particulates comprising nut shell pieces; cured resinous particulates comprising seed shell pieces; fruit pit pieces; cured resinous particulates comprising fruit pit pieces; wood; a composite particulate, and combinations thereof.

5. The method of claim 1 wherein at least one of the pieces of reticulated foam has a pore density in the range of from about 5 to about 80 pores per linear inch.

6. The method of claim 1 wherein at least one of the pieces of reticulated foam has a length no longer than about 1 inch and a width no longer than about 0.5 inch.

7. The method of claim 1 wherein at least one of the pieces of reticulated foam has a length of about 0.5 inch, a width of about 0.25 inch, and a thickness of about 0.12 inch.

8. The method of claim 1 wherein at least one of the pieces of reticulated foam comprises a material selected from the group consisting of: resins, polyolefins, polyurethanes, polyvinylchlorides, metals and ceramics.

9. The method of claim 1 wherein the pieces of reticulated foam are present in the slurry in an amount in the range of from about 0.1% to about 5% by weight of the proppant particulates in the slurry.

10. The method of claim 1 wherein the adhesive substance comprises at least one adhesive substance selected from the group consisting of: a non-aqueous tackifying agent; an aqueous tackifying agent; a silyl-modified polyamide; and a curable resin.

11. A method of fracturing a portion of a subterranean formation comprising:
creating or extending one or more fractures within a portion of a subterranean formation using hydraulic pressure;
creating a slurry comprising a treatment fluid, proppant particulates, pieces of reticulated foam having cells, and an adhesive substance such that the adhesive substance at least partially coats the proppant particulates and such that the proppant particulates become substantially embedded within the cells of the reticulated foam; and,
depositing at least a portion of the pieces of reticulated foam having proppant particulates embedded therein in the one or more fractures within the portion of the subterranean formation so as to form a high porosity propped fracture.

12. The method of claim 11 wherein the high porosity propped fracture has a porosity of at least about 50%.

13. The method of claim 11 wherein the slurry comprises less than about 1 pound of proppant particulates per gallon of treatment fluid.

14. The method of claim 11 wherein the treatment fluid comprises at least one treatment fluid selected from the group consisting of: an aqueous gel, an aqueous gel comprising a polysaccharide gelling agent, an aqueous gel comprising a crosslinked polysaccharide gelling agent, a viscoelastic surfactant gel, an oil gel, a heavy brine, a foamed gel, an emulsions and combinations thereof, and wherein the proppant particulates comprise at least one particulate material selected from the group consisting of: sand; bauxite; a ceramic material; a glass material; a polymeric material; a nylon material; a polytetrafluoroethylene; nut shell pieces; seed shell pieces; cured resinous particulates comprising nut shell pieces; cured resinous particulates comprising seed shell pieces; fruit pit pieces; cured resinous particulates comprising fruit pit pieces; wood; a composite particulate, and combinations thereof.

15. The method of claim 11 wherein at least one of the pieces of reticulated foam has a pore density in the range of from about 5 to about 80 pores per linear inch.

16. The method of claim 11 wherein at least one of the pieces of reticulated foam has a length no longer than about 1 inch and a width no longer than about 0.5 inch.

17. The method of claim 11 wherein at least one of the pieces of reticulated foam has a length of about 0.5 inch, a width of about 0.25 inch, and a thickness of about 0.12 inch.

18. The method of claim 11 wherein at least one of the pieces of reticulated foam comprises at least one material selected from the group consisting of: resins, polyolefins, polyurethanes, polyvinylchlorides, metals, and ceramics.

19. The method of claim 11 wherein the pieces of reticulated foam are present in the slurry in an amount in the range of from about 0.1% to about 5% by weight of the proppant particulates in the slurry.

20. The method of claim 11 wherein the adhesive substance comprises at least one adhesive substance selected from the group consisting of: a non-aqueous tackifying agent; an aqueous tackifying agent; a silyl-modified polyamide; and a curable resin.

* * * * *